United States Patent
McKeirnan, Jr.

(10) Patent No.: US 7,832,938 B2
(45) Date of Patent: Nov. 16, 2010

(54) FLOATING BEARING CARTRIDGE FOR A TURBOCHARGER SHAFT

(76) Inventor: Robert D. McKeirnan, Jr., 1086 Twinfoot Ct., Westlake Village, CA (US) 91361

( * ) Notice: Subject to any disclaimer, the term of this patent is extended or adjusted under 35 U.S.C. 154(b) by 430 days.

(21) Appl. No.: 11/778,517

(22) Filed: Jul. 16, 2007

(65) Prior Publication Data
US 2008/0019629 A1    Jan. 24, 2008

Related U.S. Application Data

(60) Provisional application No. 60/807,762, filed on Jul. 19, 2006.

(51) Int. Cl.
F16C 25/06 (2006.01)
F04B 17/00 (2006.01)
(52) U.S. Cl. .................... 384/504; 417/407
(58) Field of Classification Search ......... 384/499–504, 384/519, 520; 417/407; 60/598
See application file for complete search history.

(56) References Cited

U.S. PATENT DOCUMENTS

| | | | |
|---|---|---|---|
| 4,966,552 A * | 10/1990 | Gonser | 433/132 |
| RE34,276 E * | 6/1993 | Glaser et al. | 417/407 |
| 6,443,624 B1 | 9/2002 | Knepper et al. | |
| 6,739,845 B2 | 5/2004 | Woollenweber | |
| 6,877,901 B2 | 4/2005 | Woollenweber | |
| 7,025,579 B2 | 4/2006 | Woollenweber | |
| 7,371,011 B2 * | 5/2008 | McKeirnan, Jr. | 384/517 |
| 2002/0097935 A1 * | 7/2002 | Beckers et al. | 384/490 |

* cited by examiner

*Primary Examiner*—Thomas R Hannon

(57) ABSTRACT

An improved bearing system for use in high speed rotating machinery, such as a turbocharger, wherein a shaft is rotatably supported by a floating bearing cartridge having axially spaced angular contact bearings each with a set of bearing balls supported between inner and outer races. The bearing cartridge includes an inner spacer sleeve for axially spacing the inner bearing races, and a rotationally floating outer sleeve having a pair of radially inwardly open grooves for removably receiving snap-type retaining rings which engage and axially space the outer bearing races. The axial dimension of the inner spacer sleeve is elongated slightly relative to an axial dimension defined between outboard faces of the installed retaining rings, thereby slightly unloading the sets of bearing balls from their respective outer bearing races. Such slight axial unloading enhances smooth-running operation with minimal bearing wear, while accommodating transient loads during operation.

20 Claims, 4 Drawing Sheets

FLOATING BEARING CARTRIDGE FOR A TURBOCHARGER SHAFT

BACKGROUND OF THE INVENTION

This invention relates generally to improvements in bearing systems for use in high speed rotating machinery or turbomachines, particularly such as a turbocharger for supplying charge air at elevated pressure to an internal combustion engine. More particularly, this invention relates to an improved floating bearing cartridge having a pair of angular contact bearings for rotationally supporting a high speed rotary shaft, wherein the angular contact bearings are slightly unloaded, or subjected to a slight negative pre-load to enhance smooth-running operation with minimal bearing wear while accommodating radial and alternating thrust loads, thermal loads, and transient condition loads during normal operation.

Turbochargers are well known in the art for use in supplying charge air under pressure to an internal combustion engine for the purpose of increasing engine performance. Such turbochargers generally comprise a turbine wheel and a compressor wheel or impeller mounted on a common shaft which is supported by suitable bearings for high speed rotational operation. The turbine wheel is positioned within a turbine housing shaped for flow-through passage of engine exhaust gases which rotatably drive the turbine wheel at relatively high speed. The thus-driven shaft and associated bearings are typically mounted within a so-called center housing disposed between the turbine housing, and a compressor housing having the compressor impeller therein. Accordingly, the exhaust-gas driven turbine wheel rotatably drives the compressor wheel which draws in and compresses ambient air to provide pressurized charge air to the associated internal combustion engine.

Significant design and development effort has focused upon the turbocharger shaft bearings in attempts to provide reduced bearing friction losses in combination with smooth and substantially vibration-free shaft rotation in a bearing configuration that is compatible with the relatively high speed and thermal transient conditions of a turbocharger operating environment. In this regard, numerous configurations have been proposed for oil-lubricated sleeve-type journal bearings such as rotationally floating bushings mounted generally at opposite ends of the turbocharger shaft at locations generally and respectively adjacent the turbine and compressor housings. Such sleeve-type bearing systems have additionally required a separate thrust bearing typically in the form of a radial collar on the rotating turbocharger shaft to sustain axial loads during operation. However, such collar-style rotating thrust bearings have been associated with substantial friction losses.

In recent years, improved turbocharger bearing systems using improved anti-friction ball bearings have been proposed. In this regard, angular contact ball bearings have been suggested wherein a pair of angular contact ball bearing units is provided for supporting opposite ends of the high speed turbocharger shaft. See, for example, U.S. Pat. Nos. 6,739,845, 6,877,901, and 7,025,579, all of which are incorporated by reference herein. In such designs, the turbine-end and compressor-end ball bearing units are mounted within a common, generally cylindrical bearing carrier, and are respectively designed to carry thrust loads acting in opposite axial directions, namely, an inboard direction (i.e., with the thrust loads acting axially toward each other). Accordingly, the angular contact bearing units provide both radial and axial thrust bearing functions. At least one of the angular contact ball bearing units is further associated with a spring or tolerance ring for applying an axially outboard-directed thrust pre-load force to the associated bearing unit outer race, thereby accommodating at least some axial migration of the outer race relative to the bearing carrier in response to thermal transients and the like. However, the spring or tolerance ring comprises a relative compliant structure that is difficult to manufacture in a sturdy and rugged form compatible with normal turbocharger operating conditions. In addition, bearing systems using such compliant springs or tolerance rings are typically not well-suited for quick and easy precision installation into a turbocharger center housing.

The present invention relates to an improved turbocharger shaft bearing system of the general type including angular contact ball bearing units, but wherein these ball bearing units are mounted within a rotationally floating bearing cartridge adapted for quick and easy precision installation into a turbocharger center housing or the like, and further wherein the angular contact ball bearings are slightly unloaded, or subjected to a slight negative pre-load, to enhance smooth-running operation with minimal bearing wear while accommodating radial and alternating thrust loads, thermal loads, and transient condition loads during normal operation.

SUMMARY OF THE INVENTION

In accordance with the invention, an improved bearing system is provided for use in high speed rotating machinery, such as a turbocharger, wherein the improved bearing system comprises a rotationally floating bearing cartridge having a pair of axially spaced angular contact ball bearings for stable support of a high speed rotary shaft. Each angular contact ball bearing comprises a set of bearing balls interposed rotationally between inner and outer races, with the floating bearing cartridge supporting these bearing races such that the bearing balls are slightly unloaded, or subjected to a slight negative pre-load, in a static or non-operating condition. As a result, during normal turbocharger operation, the angular contact ball bearings exhibit improved smooth-running operation with reduced or minimal bearing wear, while accommodating a range of radial and alternating axial thrust loads, thermal loads, and transient condition loads during normal operation.

In one preferred form, the rotationally floating bearing cartridge comprises an inner spacer sleeve carried about the rotary shaft to extend axially between the inner races of the two angular contact bearings. A rotationally floating outer sleeve is sized for receiving the outer races of the two angular contact bearings generally within opposite ends thereof, with the two angular contact bearings each being oriented to accommodate thrust loads acting in an axially inboard direction.

The outer sleeve of the floating bearing cartridge includes a pair of radially inwardly open annular grooves for receiving and supporting a corresponding pair of retaining rings, such as a pair of snap-type retaining rings seated therein. These retaining rings respectively define outboard faces for engaging and axially spacing the outer races of the two angular contact bearings.

In accordance with the invention, the axial dimension defined by the inner spacer sleeve is slightly elongated relative to the axial dimension defined by the outboard faces of the installed retaining rings, whereby the bearing balls of the two angular contact bearings are slightly unloaded, or subjected to a slight negative pre-load, in a static or at-rest non-operating condition. With this arrangement, the angular contact bearings achieve smooth-running operation with reduced bearing wear during normal turbocharger operating conditions, including improved accommodation of radial and alternating axial thrust loads, thermal loads, and transient condition loads during normal operation.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
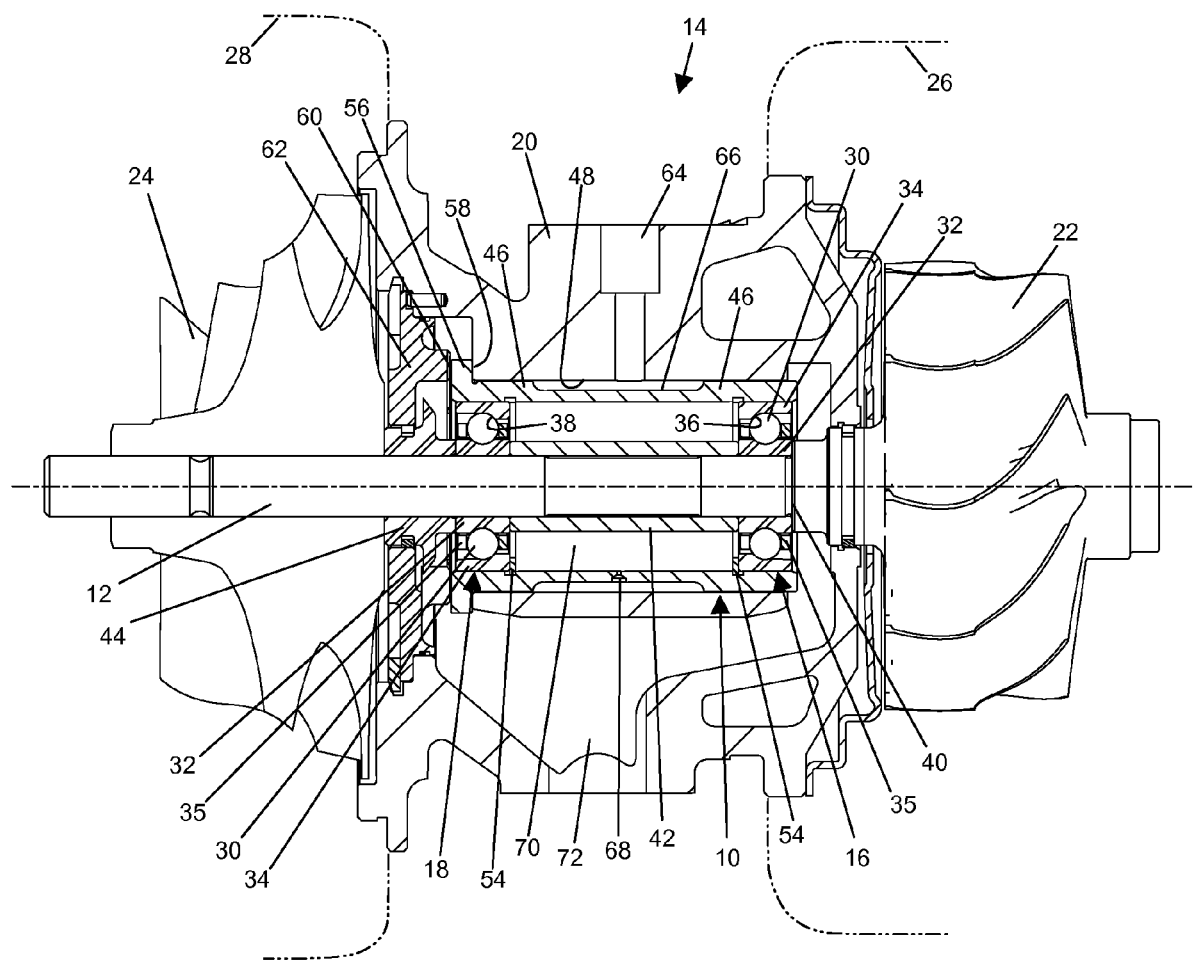
FIG. 1 is vertical sectional view of a portion of a turbocharger taken along a plane through a central axis of rotation thereof, wherein the illustrative turbocharger incorporates an improved floating bearing cartridge embodying the novel features of the present invention.
Figure 2:
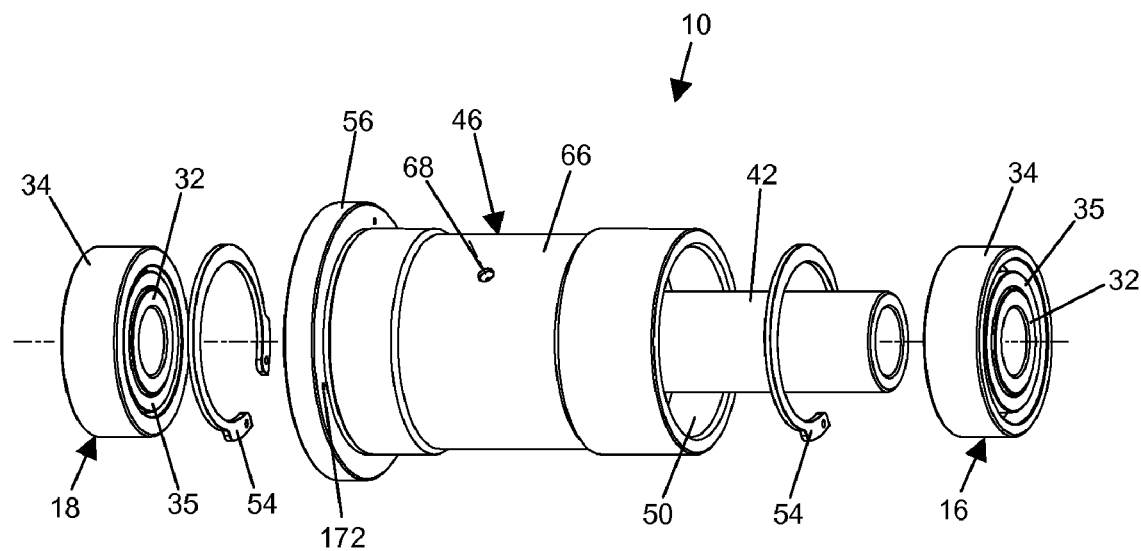
FIG. 2 is an exploded perspective view showing components of the improved bearing cartridge.
Figure 3:
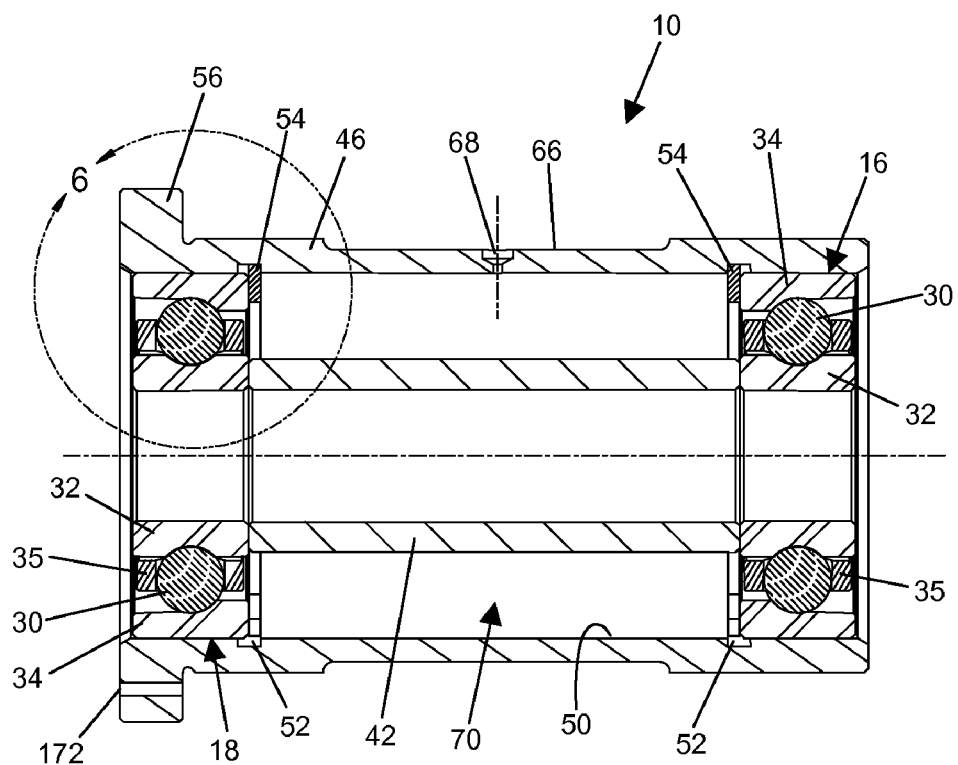
FIG. 3 is an enlarged vertical sectional view corresponding with a portion of FIG. 1, and illustrating one preferred form of the invention.

As shown in the exemplary drawings, an improved turbomachine shaft bearing cartridge or system referred to generally in FIGS. 1-3 by the reference numeral 10 is provided for rotatably supporting a rotating shaft 12 in high speed machinery such as the illustrative turbocharger 14 (FIG. 1). The improved bearing cartridge 10 includes a pair of axially spaced angular contact ball bearings or ball bearing units 16 and 18 for rotationally supporting the shaft 12 within a housing such as the illustrative turbocharger center housing 20. These angular contact bearings 16, 18 are designed to accommodate alternating thrust loads during normal turbocharger operation. In accordance with the invention, the angular contact bearings 16, 18 are slightly unloaded, or subjected to a slight negative pre-load, in a static or at-rest non-operating condition whereby the bearings 16, 18 achieve improved smooth-running operation with reduced bearing wear and with improved accommodation of radial and alternating axial thrust loads, thermal loads, and transient condition loads during normal operation.

The turbocharger 14 shown in FIG. 1 generally comprises a turbine wheel 22 and a compressor wheel or impeller 24 mounted at opposite ends of the rotary shaft 12. As is known in the art, the turbine wheel 22 is positioned within a turbine housing 26 coupled to an exhaust gas stream from an internal combustion engine (not shown) for rotationally driving the turbine wheel at relatively high speed. The exhaust gas driven turbine wheel 22 thus rotationally drives the supporting shaft 12, which in turn rotationally drives the compressor impeller 24 at the same relatively high rotational speed. The impeller 24 is normally positioned within a compressor housing 28 to draw in and compress ambient air to provide a supply of pressurized charge air to the air intake side of the internal combustion engine, thereby accommodating engine operation at increased performance levels, all in a manner well known to persons skilled in the art.

The turbine and compressor housings 26, 28 are normally mounted onto the center housing 20 which incorporates the improved bearing system or cartridge 10 for rotationally supporting the common shaft 12 during turbocharger operation. In this regard, the bearing cartridge 10 is required to support the shaft 12 throughout a relatively broad range of rotational speeds and transient thrust loads in a relatively hostile exhaust gas and related internal combustion engine operating environment which includes broad-range thermal fluctuations and frequent sustained operation at relatively high temperature. The improved bearing cartridge 10 of the present invention provides a simplified yet reliable bearing arrangement adapted for long-term smooth-running operation with reduced or minimal bearing wear, while accommodating the range of radial and alternating axial thrust loads, thermal loads, and transient condition loads during normal turbocharger operation. In addition, the improved bearing cartridge 10 is relative easy to manufacture, install and service in a high-precision manner.

The improved bearing cartridge 10 (shown best in FIGS. 2-3) utilizes the pair of ball bearing units 16, 18 of so-called angular contact style. In this regard, each of these angular contact bearings 16, 18 includes a complement of relatively low friction or anti-friction bearing balls 30 formed from a suitable material such as metal or ceramic, and constrained radially between a ring-shaped inner race 32 and a ring-shaped outer race 34. A cage 35 may also be provided between the associated races 32, 34 for additionally constraining and retaining the complement of bearing balls 30. As shown in FIG. 1, the first bearing unit 16 comprises a turbine-end bearing unit, with the outer race ring 34 thereof defining an axially an outboard-presented shoulder 36 whereby the turbine-end bearing unit 16 is adapted to carry a unidirectional thrust load acting in an inboard direction during turbocharger operation. In a similar manner, the second bearing unit 18 comprises a compressor-end bearing unit, with the outer race ring 34 defining an axially outboard-presented shoulder 38 whereby the compressor-end bearing unit 18 is also adapted to carry a unidirectional thrust load acting in an inboard direction during turbocharger operation. Importantly, in this arrangement, the turbine-end and compressor-end bearing units 16, 18 are designed to carry thrust loads acting in opposite axial directions, namely, an axially inboard direction relative to the center housing 20 (i.e., with the thrust loads acting axially toward each other).

These two angular contact style bearings 16, 18 are mounted onto the turbocharger shaft 12 generally at opposite ends thereof, and within the center housing 20 generally adjacent appropriate housing ends walls through which the shaft 12 extends into the adjacent turbine and compressor housings 26, 28. As shown in the exemplary drawings, the turbine-end bearing 16 is installed onto the shaft 12 with close tolerance as by press-fitting the inner race 32 thereon with an outboard face of the inner race 32 abutting a radially enlarged step shoulder 40 on the shaft 12. An elongated and generally cylindrical or tubular inner bearing spacer sleeve 42, forming a portion of the floating bearing cartridge 10, is slidably mounted onto the shaft 12 with one axial end of the inner spacer sleeve 42 abutting an inboard face of the inner race 32 of the turbine-end angular contact bearing 16. The second or compressor-end bearing 18 is then installed onto the shaft 12 as by press-fitting the inner race ring 32 thereof into abutting engagement with an opposite end of the inner spacer sleeve 42. Finally, a relatively short cylindrical spacer collar 44 or the like is fitted onto the shaft 12 in a position interposed axially between an axially outboard face of the compressor-end inner race 32 and an inboard face of the compressor impeller 24. Accordingly, with this construction, means are provided for essentially defining and retaining the inner races 32 of the two angular contact bearings 16, 18 at essentially predetermined positions along the length of the turbocharger shaft 12, i.e., generally at opposite ends of the shaft 12 within the center housing 20.

The improved bearing cartridge 10 of the present invention further comprises a rotationally floating outer sleeve 46 (FIGS. 2-4) having a diametric size for slide-fit, substantially fully rotational mounting into a relatively large bore 48 formed in the center housing 20 (as viewed in FIG. 1). This outer sleeve 46 has a generally cylindrical cross sectional shape defining an internal bore 50. This internal bore 50 is sized, particularly at the axially opposed ends of the outer sleeve 46, for respectively receiving and supporting as by press-fit reception the outer races 34 of the two angular contact bearings 16, 18. The internal bore 50 is formed in the outer sleeve 46 such that at least the opposite ends thereof are precisely located on the same coaxial centerline. With this construction, subsequent assembly with the bearings 16, 18 assures true coaxial bearing alignment for smooth-running shaft rotation during turbocharger operation.

Figure 5:
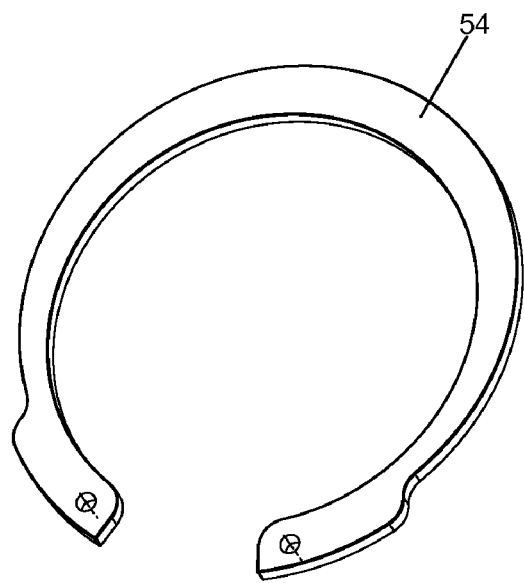
FIG. 5 is a perspective view of an exemplary retaining ring for use in the bearing cartridge of FIGS. 1-3.

As shown in accordance with the illustrative preferred form of the invention, a pair of radially inwardly open and preferably annular or full-circle undercut grooves 52 interrupt the internal bore 50 of the outer sleeve 46 at respective positions generally located at the inboard sides or inboard faces of each of the two outer races 34 of the bearings 16, 18. A pair of retaining rings 54 such as a snap-type, generally C-shaped retaining ring (FIG. 5), are removably and respectively seated within these grooves 52. These retaining rings 54 respectively engage and support, or provide axial stops for engaging and supporting the inboard sides or inboard faces of the two outer races 34 of the angular contact bearings 16, 18.

Pursuant to a primary aspect of the invention, the axial dimension of the inner spacer sleeve 42 is precisely predetermined relative to the axial dimension defined by the outboard-presented faces of the two retaining rings 54 when installed into the associated grooves 52 in the outer sleeve 46. More particularly, the axial dimension as defined by the axial length of the inner spacer sleeve 42 is slightly elongated relative to the axial spacing between the outboard faces of the two installed retaining rings 54, whereby the bearing balls 30 of the two bearing units 16, 18 are slightly unloaded axially (or subjected to a slight negative pre-load) relative to the associated outer races 34. This arrangement requires precision formation of the axial length of the inner spacer sleeve, as well as precision formation of the inboard side edges 52' (FIGS. 4 and 6) of the ring grooves 52 in combination with the axial widths or thicknesses of the two retaining rings 54.

In one exemplary embodiment, the inner spacer sleeve 42 was constructed with a precision axial length of 1.6345 inch, +/−0.0003 inch, whereas the two ring grooves 52 formed in the outer sleeve 46 were formed with a precision axial spacing between the inboard groove side edges 52' of 1.557 inch, +/−0.0003 inch. The two retaining rings comprised identical metal retaining rings obtained from Bearing Engineers, Inc., Aliso Viejo, Calif., Part No. H01-100-SS, and were lap ground for precision axial widths of 0.0380 inch, +/−0.0002 inch. With these parameters and tolerance ranges, the axial dimension of the inner spacer sleeve 42 was virtually certain to be elongated by a few thousandths of an inch relative to the outboard faces of the installed retaining rings 54, thereby slightly unloading the two angular contact bearings 16, 18 in a static or non-operational turbocharger condition.

Figure 6:
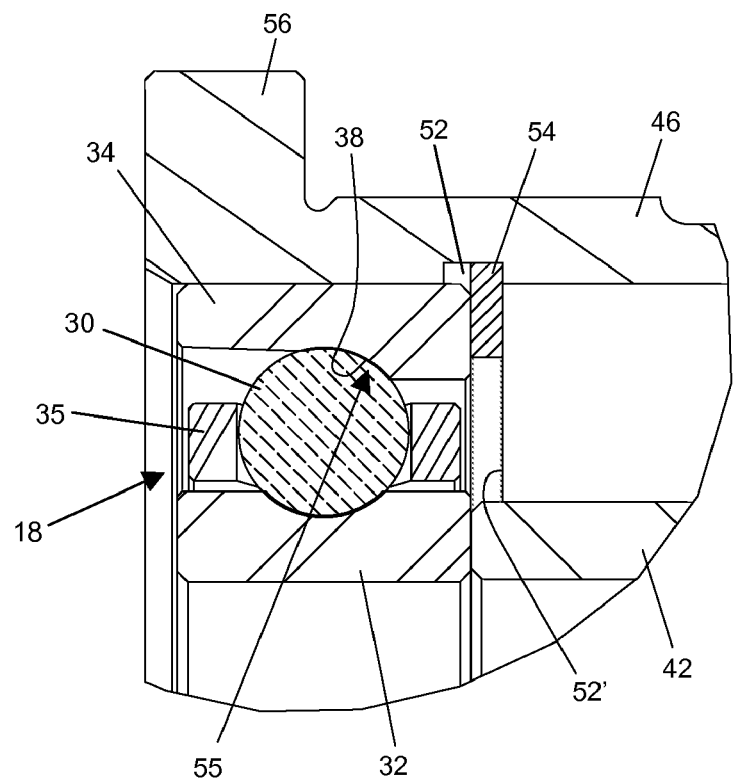
FIG. 6 is an enlarged fragmented vertical sectional view of a portion of the improved bearing cartridge, corresponding generally with the encircled region 6 of FIG. 3.

This slight axial unloading of the angular contact bearings 16, 18 is shown best in FIG. 6 with respect to the compressor-side bearing 18. That is, since the adjacent compressor-side end of the inner spacer sleeve 42 is axially elongated relative to the outboard or compressor-side face of the adjacent retaining ring 54, the retaining ring 54 exerts no thrust pre-load on the outer race 34 which in turn exerts no thrust pre-load via its outboard-facing shoulder 38 on the complement of bearing balls 30 (as indicated at arrow 55 in FIG. 6). However, the outer race 34 is not allowed to shift axially inboard by a distance sufficient to create bearing instability at high speed operation. Accordingly, the slightly unloaded angular contact bearings 16, 18 exhibit improved smooth-running operation with reduced bearing wear during turbocharger operation, substantially without bearing ball skidding or skipping. However, the degree of unloading is not sufficient to preclude normal and desirable function of the angular contact bearings 16, 18 to accommodate normal radial loads as well as inboard-direction thrust loads and/or thermal transient loads throughout a range of turbocharger operating conditions.

During operation, the outer sleeve 46 of the bearing cartridge 10 is axially constrained relative to the housing components as by means of a radially enlarged thrust flange 56. As shown in FIG. 1, this thrust flange 56 may be formed at the compressor end of the outer sleeve 46, and is axially positioned between thrust faces 58 and 60 formed respectively on adjacent housing structures, such as on the center housing 20 and a compressor-end seal plate 62, as shown. Persons skilled in the art will appreciate that the thrust flange 56 may be formed at virtually any axial location along the length of the outer sleeve 46, with the illustrative compressor-end location being preferred.

Lubricant such as oil can be supplied under pressure via an oil inlet 64 (FIG. 1) formed in the center housing 20 to a circumferential recessed channel 66 formed about the exterior of the outer sleeve 46. From the channel 66, the lubricating oil may flow through one or more radially open inflow ports 68 formed in the outer sleeve 46 into an elongated cylindrical space 70 between the inner and outer sleeves 42, 46. From this annular space 70, the oil flow axially in opposite directions to lubricate the pair of angular contact bearings 16, 18, prior to collection via a sump 72 of the center housing 20 for recirculation.

In operation, as the shaft 12 is rotationally driven, the angular contact bearings 16, 18 function as described to rotationally support the shaft 12, and also to accommodate transient thrust and thermal loads. The outer sleeve 46, in a preferred form, may also rotate within the center housing bore 48. In this regard, the radial tolerance or gap between the sizes of the center housing bore 48 and the outer sleeve 46 may be designed so that the outer sleeve 46 rotates generally at a predetermined ratio of shaft speed, such as about one-third to about one-half of shaft speed. With this arrangement, the overall rotating speed and thus the rotational load carried by the angular contact bearings 16, 18 is reduced for increased bearing service life.

The radial tolerance or gap between the outside diameter of the outer sleeve 46 and the housing bore 48 additionally controls vibration damping of the bearing cartridge 10 during operation. In this regard, the circumferential channel 66 is formed between and thus effectively defines a pair of bearing pads at opposite ends of the outer sleeve 46. Lubricating oil within the central channel 66 flows axially in opposite outboard directions into and through the radial gap between the sleeve 46 and bore 48 for vibration damping. The lubricating oil also flows between the thrust flange 56 and the adjoining thrust faces on the center housing 20 and seal plate 62 to provide additional vibration damping.

The diametric sizing and the axial lengths of the two bearing pads and the central channel 66 can be selected variably and individually to control damping characteristics of the bearing cartridge 10 within the housing bore 48. Such design selection accommodates a tunable dampening characteristic for the bearing cartridge 10, based on dynamic characteristics of the rotating group including the shaft 12, turbine wheel 22, and compressor wheel 24.

Figure 4:
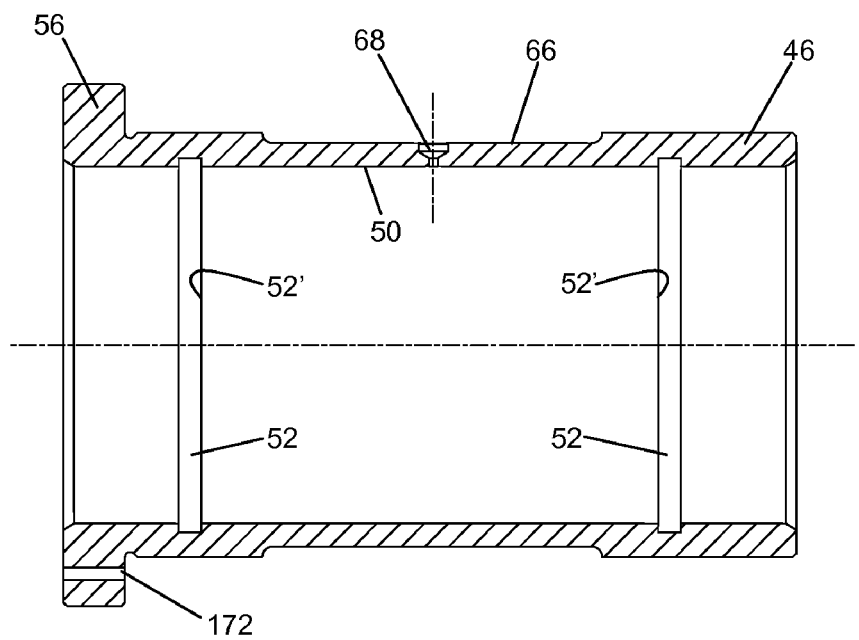
FIG. 4 is an enlarged vertical sectional view depicting a rotationally floating outer sleeve forming a portion of the improved bearing cartridge.

In addition, as a further alternative as viewed in FIGS. 2-4, one or more axially open oil flow ports 172 can be formed in the sleeve 46 generally at the base of the radially enlarged thrust flange 56 for providing a dampening film flow of oil between the thrust flange 56 and the thrust face 60 (FIG. 1) on the adjacent housing structure.

Figure 7:
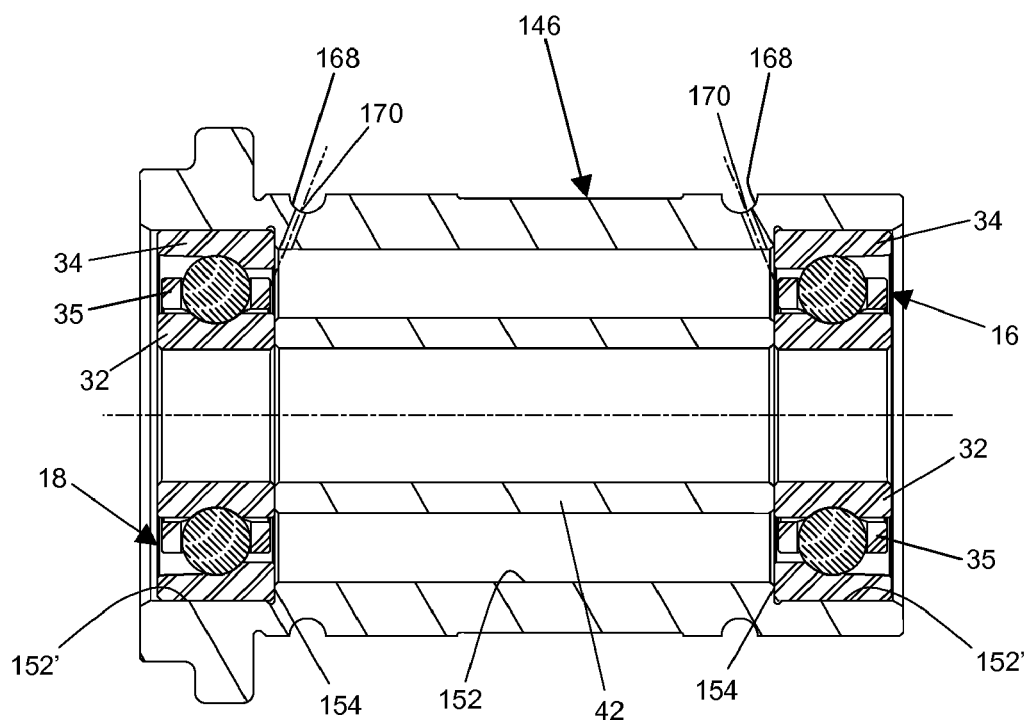
FIG. 7 is an enlarged vertical sectional view similar to FIG. 3, but showing one alternative preferred form of the invention.

FIG. 7 depicts one alternative preferred form of the invention, wherein a modified outer sleeve 146 carries the pair of angular contact bearings 16, 18 as previously described, and further wherein the axial spacing between inner races 32 of the two bearings 16, 18 is precision determined by the inner spacer sleeve 42. The outer sleeve 146 is modified in that modified counterbores 152' are formed at opposite ends of the sleeve 146, and defined by step-increased diametric size relative to a sleeve bore 152 extending therebetween. In contrast with the embodiment depicted in FIGS. 1-6, the outer races 34 of the two angular contact bearings 16, 18 are seated respectively within the counterbores 152' at the opposite ends of the outer sleeve 146 with inboard faces of these outer races bearing against the outboard-presented shoulder faces 154 defined by the stepped sleeve bore 152. Oil inflow to the bearing units 16, 18 is achieved via an oil inflow circumferential groove 168 and oil inflow ports 170 formed in the outer sleeve 146 at positions disposed generally adjacent each of the two bearing units. In addition, as previously shown and described, the axial length of the inner spacer sleeve 42 is slightly elongated relative to the axially outboard-presented shoulder faces 154, resulting in slight axial unloading of the angular contact bearings 16, 18 when the turbocharger is in a static or non-operational condition.

A variety of further modifications and improvements in and to the improved bearing cartridge of the present invention will be apparent to persons skilled in the art. By way of example, persons skilled in the art will appreciate that the outer races 34 of the two bearing units 16, 18 may be integrated into the outer sleeve 46, and/or that the inner races 32 may be integrated into an axially split inner spacer sleeve 42, thereby simplifying the overall construction of the bearing cartridge 10. By way of further example, the cartridge outer sleeve may be constrained to prevent rotation but permit axial flotation within the center housing, if desired. Accordingly, no limitation on the invention is intended by way of the foregoing description and accompanying drawings, except as set forth in the appended claims.

What is claimed is:

1. In a turbomachine including a center housing disposed axially between a drive element and a driven element, and a shaft extending through said center housing and interconnecting said drive and driven elements, a floating bearing cartridge for rotationally supporting said shaft within said center housing, said floating bearing cartridge comprising:

a pair of angular contact bearings each having an inner race for mounting onto said shaft for rotation therewith, an outer race, and a complement of bearing balls interposed between said inner and outer races;

an inner spacer sleeve for axially spacing said inner races of said pair of angular contact bearings by a first predetermined dimension; and an outer spacer sleeve for mounting within said center housing, said outer space sleeve carrying a pair of opposed faces for respectively engaging said outer races of said pair of angular contact bearings, said pair of opposed faces being axially separated by a second predetermined dimension;

said first predetermined dimension being at least slightly elongated relative to said second predetermined dimension, whereby said angular contact bearing are subjected to a negative pre-load when the turbomachine is in a static condition.

2. The turbomachine of claim 1 wherein said turbomachine comprises a turbocharger, and further wherein said drive element comprises a turbine wheel mounted at one end of said shaft, and said driven element comprises a compressor wheel mounted at an opposite end of said shaft.

3. The turbomachine of claim 1 wherein said center housing defines a bearing bore, said outer spacer sleeve having a size and shape for rotational floating mounting within said bearing bore.

4. The turbomachine of claim 3 wherein said outer spacer sleeve defines a pair of bearing pads disposed generally at opposite ends thereof for rotational floating support of said outer spacer sleeve within said bearing bore, and a radially recessed circumferential channel of selected axial length extending between said bearing pads, and further including an oil supply for oil flow into said channel axially between said bearing pads.

5. The turbomachine of claim 4 wherein the diametric sizes and axial lengths of said bearing pads and said circumferential channel are individually selected to achieve tunable vibration damping.

6. The turbomachine of claim 4 wherein said outer spacer sleeve further defines a radially enlarged thrust flange.

7. The turbomachine of claim 6 wherein said thrust flange has at least one axially open oil flow port formed therein.

8. The turbomachine of claim 1 wherein said outer spacer sleeve further defines a radially enlarged thrust flange.

9. The turbomachine of claim 1 wherein said inner race of each of said angular contact bearings is sized and shaped for substantially press-fit installation onto said shaft.

10. The turbomachine of claim 1 wherein each of said angular contact bearings is oriented to carry a unidirectional thrust load acting in an inboard direction during turbomachine operation.

11. The turbomachine of claim 1 wherein said outer spacer sleeve has a pair of generally annular and radially inwardly open grooves formed therein, and further including a pair of rings seated respectively within said grooves, said rings defining said pair of faces for respectively engaging said outer races of said pair of angular contact bearings.

12. The turbomachine of claim 11 wherein said pair of rings comprises a pair of snap rings.

13. The turbomachine of claim 1 wherein said outer spacer sleeve defines a pair of axially outboard presented step shoulders respectively defining said pair of faces for engaging said outer races of said pair of angular contact bearings.

14. In a turbomachine including a center housing disposed axially between a drive element and a driven element, and a shaft extending through said center housing and interconnecting said drive and driven elements, a floating bearing cartridge for rotationally supporting said shaft within said center housing, said floating bearing cartridge comprising:

a pair of angular contact bearings each having an inner race for mounting onto said shaft for rotation therewith, an outer race, and a complement of bearing balls interposed between said inner and outer races;

each of said angular contact bearings being oriented to carry a unidirectional thrust load acting in an inboard direction during turbomachine operation;

an inner spacer sleeve for axially spacing said inner races of said pair of angular contact bearings by a first predetermined dimension;

an outer spacer sleeve adapted for mounting within said center housing, said outer space sleeve having a pair of generally annular and radially inwardly open grooves formed therein; and a pair of rings seated respectively within said grooves, said rings defining a pair of opposed faces for respectively engaging said outer races of said pair of angular contact bearings, said pair of opposed faces being axially separated by a second predetermined dimension;

said first predetermined dimension being at least slightly elongated relative to said second predetermined dimension, whereby said angular contact bearing are subjected to a negative pre-load when the turbomachine is in a static condition.

15. The turbomachine of claim 14 wherein said turbomachine comprises a turbocharger, and further wherein said drive element comprises a turbine wheel mounted at one end of said shaft, and said driven element comprises a compressor wheel mounted at an opposite end of said shaft.

16. The turbomachine of claim 14 wherein said center housing defines a bearing bore, said outer spacer sleeve having a size and shape for rotational mounting within said bearing bore.

17. The turbomachine of claim 14 wherein said pair of rings comprises a pair of snap rings.

18. In a turbomachine including a center housing disposed axially between a drive element and a driven element, and a shaft extending through said center housing and interconnecting said drive and driven elements, a floating bearing cartridge for rotationally supporting said shaft within said center housing, said floating bearing cartridge comprising:

a pair of angular contact bearings each having an inner race for mounting onto said shaft for rotation therewith, an outer race, and a complement of bearing balls interposed between said inner and outer races;

each of said angular contact bearings being oriented to carry a unidirectional thrust load acting in an inboard direction during turbomachine operation;

an inner spacer sleeve for axially spacing said inner races of said pair of angular contact bearings by a first predetermined dimension;

an outer spacer sleeve adapted for mounting within said center housing, said outer space sleeve having a pair of axially outboard presented step shoulders respectively defining a pair of opposed faces for engaging said outer races of said pair of angular contact bearings, said pair of opposed faces being axially separated by a second predetermined dimension;

said first predetermined dimension being at least slightly elongated relative to said second predetermined dimension, whereby said angular contact bearing are subjected to a negative pre-load when the turbomachine is in a static condition.

19. The turbomachine of claim 18 wherein said turbomachine comprises a turbocharger, and further wherein said drive element comprises a turbine wheel mounted at one end of said shaft, and said driven element comprises a compressor wheel mounted at an opposite end of said shaft.

20. The turbomachine of claim 18 wherein said center housing defines a bearing bore, said outer spacer sleeve having a size and shape for rotational mounting within said bearing bore.

* * * * *